(No Model.) 4 Sheets—Sheet 1.

G. A. NEWTON.
BOILER OR OTHER FURNACE.

No. 534,515. Patented Feb. 19, 1895.

Witnesses:—
Cassell Severance
W. Harvy Muzzy

Inventor:—
George Alexander Newton
by his Attys (No Model.) 4 Sheets—Sheet 2.

G. A. NEWTON.
BOILER OR OTHER FURNACE.

No. 534,515. Patented Feb. 19, 1895.

Witnesses:—
Cassell Severance
W. Harvey Muzzy

Inventor:—
George Alexander Newton
by his Attys
Mason Fenwick Lawrence (No Model.) 4 Sheets—Sheet 3.

G. A. NEWTON.
BOILER OR OTHER FURNACE.

No. 534,515. Patented Feb. 19, 1895.

Witnesses:—
Cassell Severance
W. Harvey Muzzy

Inventor
George Alexander Newton
by his Atty (No Model.) 4 Sheets—Sheet 4.

G. A. NEWTON.
BOILER OR OTHER FURNACE.

No. 534,515. Patented Feb. 19, 1895.

Witnesses

Inventor

UNITED STATES PATENT OFFICE.

GEORGE A. NEWTON, OF LIVERPOOL, ENGLAND.

BOILER OR OTHER FURNACE.

SPECIFICATION forming part of Letters Patent No. 534,515, dated February 19, 1895.

Application filed October 12, 1894. Serial No. 525,707. (No model.)

*To all whom it may concern:*

Be it known that I, GEORGE ALEXANDER NEWTON, engineer, a subject of the Queen of Great Britain, residing at Liverpool, in the county of Lancaster, in the Kingdom of England, have invented certain new and useful Improvements in Boiler or other Furnaces, of which the following is a specification.

This invention relates to steam boilers or other furnaces and flues, and is designed to obtain a more perfect and uniform combustion and an increased economy in fuel, and greater control over the combustion, together with almost total extinction of smoke.

This invention is best described by aid of the accompanying drawings, in which—

Figure 2:
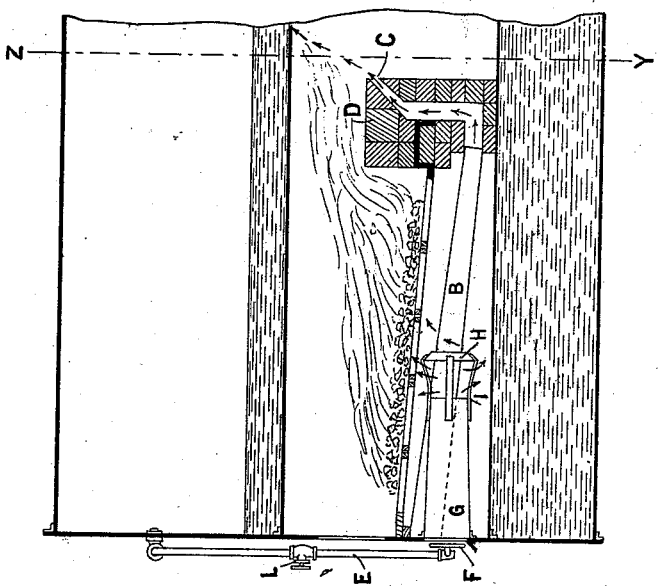
Figure 1:
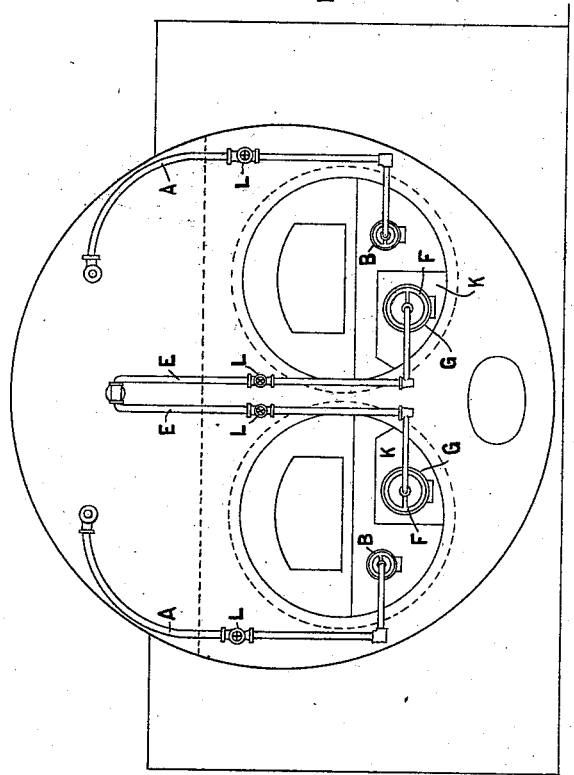
Figure 4:
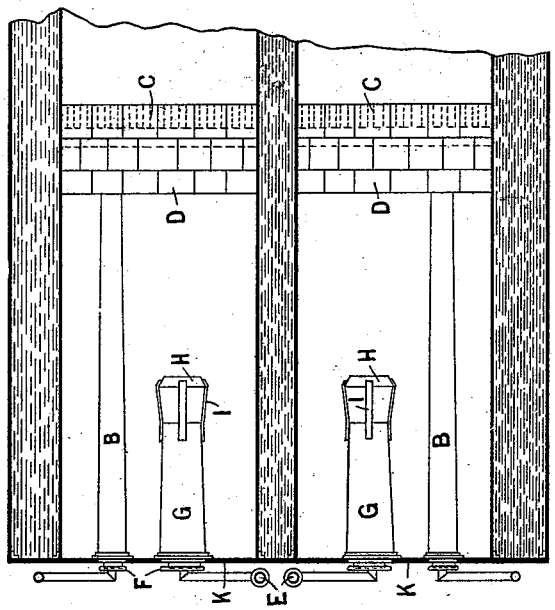
Figure 3:
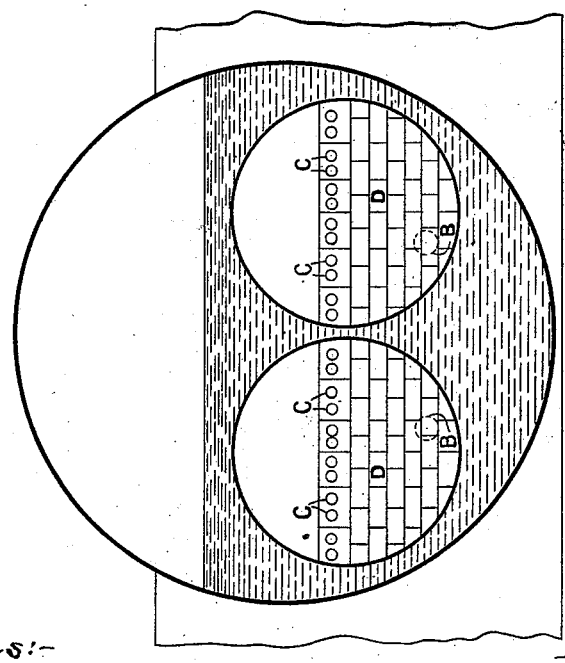
Figure 7:
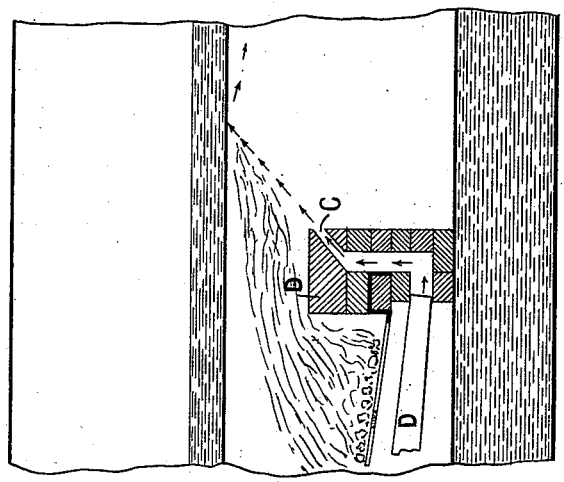
Figure 5:
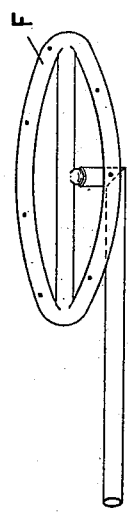
Figure 6:
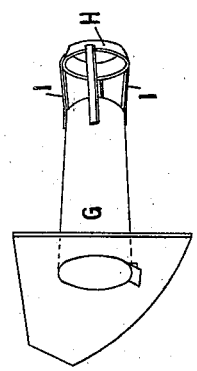
Figure 9:
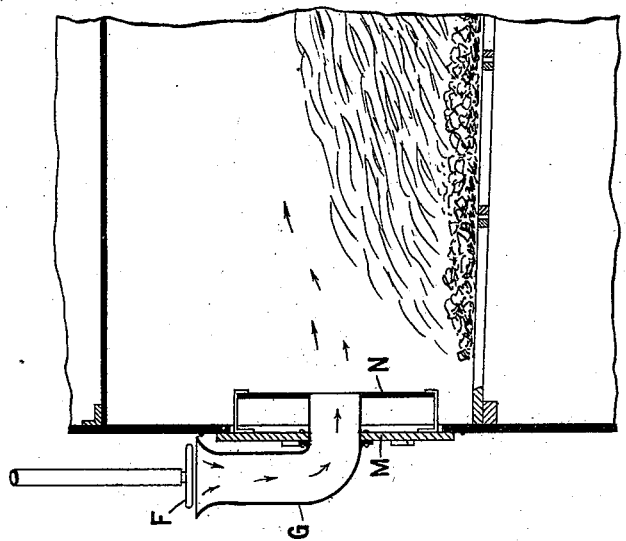
Figure 8:
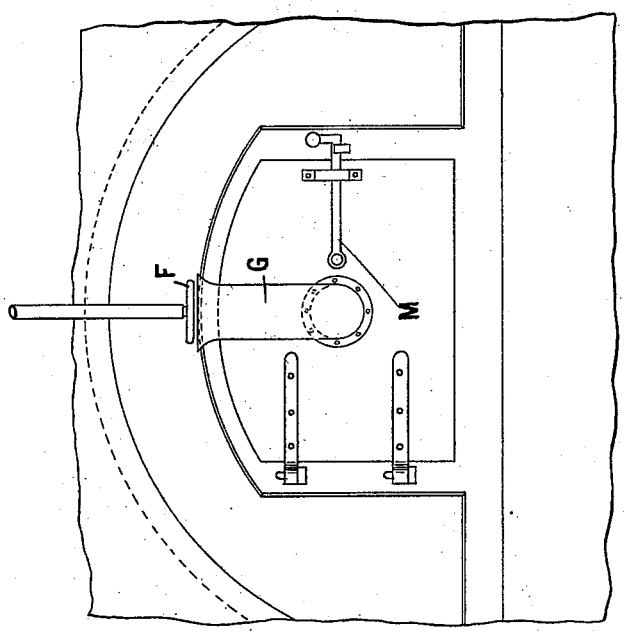

Figure 1 is a front view of a boiler fitted with my apparatus; Fig. 2, a partial longitudinal section of same; Fig. 3, a section through Z Y of Fig. 2; Fig. 4, a plan of part shown in Fig. 2; Fig. 5, an enlarged view of jet; Fig. 6, an enlarged view of air inlet; Fig. 7, a modification showing the top bricks of the furnace which I sometimes make in one single piece as therein shown, extending right across the bridge, instead of being built up as set forth in Fig. 2. Fig. 3 correctly shows the front view of both forms of brick. Figs. 8 and 9 show the crown of jets applied to driving air into the furnace above the bars.

In thus showing my apparatus applied to a two flued boiler, I do not wish at all to confine it thereto as it is equally applicable for almost all furnaces.

In the drawings A A are two pipes each leading from the steam space of the boiler or other source of steam supply to a single jet or a crown of jets somewhat similar to Fig. 5 drawing the air into pipe B, Fig. 2, and thus through the bridge D and out at the outlets C behind the bridge so as to induce a very strong draft; E E, two pipes from the steam chamber of the boiler, each leading to a ring of jets F set forth in detail, Fig. 5, and placed at the front of the air entrance pipe G. This pipe projects into the ashpit beneath the furnace bars. In order to prevent it blowing straight out into the end of the ashpit, I place some distance in front of it a dished or baffled plate H supported by suitable metal strips I on the end of pipe G. This baffle plate deflects the air upward, downward and sidewise and causes it to spread tolerably uniformly over the under surface of the bars, but to give the most powerful draft in the center where it is most desired.

The front of the ashpit is closed by the furnace plate K so as to prevent the enforced draft caused by the jets, from escaping out of the front.

On each of the jet pipes leading from the steam space of the boiler is a cock or stop valve L. I do not confine myself however to this special arrangement of steam supply pipe or even to the use of steam at all, as where air under pressure is obtainable its use is even preferable to that of steam. Further, I may have one or several pipes leading to the bridge, and one or several pipes G opening out into the ash pit. Further instead of a series of round openings C there can be a long slit, and this slit or the openings can be of any desirable shape.

The mode of action is as follows:—The fire being lighted on the hearth, steam or compressed air is passed through the jets. The result is a powerful induced draft of air below the bars and out beyond the bridge. By this means a very vivid combustion is caused in the furnace. In those cases however where the steam is brought from the boiler itself, this steam is not applicable for starting the boiler in the first instance. In this case therefore I either start it in the usual manner allowing a good draft through the ashpit through a door used for cleaning out the ashpit, or I supply air by means of a bellows or otherwise. The air coming out beyond the bridge being in the direction of the draft, assists in inducing a further speed in the incoming air, and also causes a vivid combustion of the smoke. Whenever coal is thrown onto the fire, the air jets are momentarily increased by the attendant by means of the stop valves L, thus preventing smoke. The attendant however can regulate the admission of steam to any required extent. Thus during hours when the engine is stopped, little or no steam is passed into the tubes G and B, also when running easily these jets are in great measure shut off except immediately after firing, when they are opened, especially the jets into tubes B, in order to overcome the smoke. Where, however, the boiler requires forcing, the jets into tube G are always at full pressure, and only those into tube B are regulated to suit the requirements of the smoke. The baffle plate H can also be varied in a great variety of ways and the tubes G can have their orifices so arranged as to spread the air on its exit therefrom. I prefer however a curved or dished baffle plate substantially as described.

The arrangement in Figs. 8 and 9 is similar, but in this case, the air is admitted above the fire thus inducing a powerful draft of air above the bars. G is the air entrance pipe; F, the ring of steam or air jets; M, the fire door in which the pipe G is fixed; N, a baffle pipe for protecting the door from the heat of the furnace.

I declare that what I claim is—

1. In a boiler or other furnace, the combination, of injector tubes discharging into the ash pit, baffle plates secured by space bars to the inner ends of said tubes so as to cause the discharge therefrom to be lateral thereto, and a steam and air supply to said injector tubes, substantially as described.

2. In a boiler or other furnace, the combination, of baffled injector tubes discharging into the ash pit injector tubes passing through the ash pit and discharging above the bridge to create a forced draft, steam supply pipes provided with perforated, ring-shaped ends adapted to discharge into the outer open ends of the injector tubes and thereby draw air into the same about the peripheries and through the centers of the ring discharging ends, substantially as described.

In testimony whereof I have signed my name to this specification in the presence of two subscribing witnesses.

G. A. NEWTON.

Witnesses:
 G. C. DYMOND,
 W. H. BEESTON.